(12) United States Patent
Labordus et al.

(10) Patent No.: US 12,722,345 B2
(45) Date of Patent: Sep. 1, 2026

(54) METHOD FOR ELECTROMAGNETIC WELDING OF MOLDED PARTS AND A HEAT SINK FOR USE IN SUCH METHOD

(71) Applicant: Kok & Van Engelen Composite Structures B.V., The Hague (NL)

(72) Inventors: Maarten Labordus, The Hague (NL); Michiel Bruijkers, The Hague (NL); Thomas Wirtz, The Hague (NL); Alexandros Mitrousias, The Hague (NL); Eirini Tsiangou, The Hague (NL); Rutger Schutte, The Hague (NL)

(73) Assignee: KOK & VAN ENGELEN COMPOSITE STRUCTURES B.V., The Hague (NL)

( * ) Notice: Subject to any disclaimer, the term of this patent is extended or adjusted under 35 U.S.C. 154(b) by 177 days.

(21) Appl. No.: 18/700,416

(22) PCT Filed: Oct. 6, 2022

(86) PCT No.: PCT/NL2022/050561
§ 371 (c)(1),
(2) Date: Apr. 11, 2024

(87) PCT Pub. No.: WO2023/063817
PCT Pub. Date: Apr. 20, 2023

(65) Prior Publication Data

US 2025/0074009 A1 Mar. 6, 2025

(30) Foreign Application Priority Data

Oct. 15, 2021 (NL) ...................................... 2029435

(51) Int. Cl.
*B29C 65/00* (2006.01)
*B29C 65/32* (2006.01)

(52) U.S. Cl.
CPC .......... *B29C 66/3494* (2013.01); *B29C 65/32* (2013.01); *B29C 66/348* (2013.01);
(Continued)

(58) Field of Classification Search
CPC .............. B29C 66/3494; B29C 66/348; B29C 66/3474; B29C 66/8122; B29C 65/32; B29C 65/3604
See application file for complete search history.

(56) References Cited

FOREIGN PATENT DOCUMENTS

| | | | |
|---|---|---|---|
| EP | 0281347 | A2 | 9/1988 |
| EP | 3785885 | A1 | 3/2021 |

(Continued)

OTHER PUBLICATIONS

International Search Report and Written Opinion in International Application No. PCT/NL2022/050561, mailed on Dec. 12, 2022, 10 pages.

(Continued)

*Primary Examiner* — Daniel McNally
(74) *Attorney, Agent, or Firm* — KDW Firm PLLC

(57) ABSTRACT

A heat sink for use in electromagnetic welding of molded parts includes reinforcing fibers embedded in a matrix material, where substantially all of the reinforcing fibers are oriented unidirectionally in a fiber direction, where the reinforcing fibers have a thermal conductivity at room temperature from 100-1000 W/m.° K and an electrical resistivity at room temperature from 0.5-10 μΩ.m, and where the matrix material comprises a high temperature resistant material, optionally a thermosetting resin, having a glass transition temperature Tg above 350° C. The heat sink is used in a method of connecting surfaces of a first molded part and a second molded part by electromagnetic welding.
(Continued)

Cooling of the outer surface of the first molded part is provided by the heat sink in direct contact with the outer surface.

20 Claims, 3 Drawing Sheets

(52) U.S. Cl.
CPC ................ *B29K 2995/0005* (2013.01); *B29K 2995/0013* (2013.01)

(56) References Cited

FOREIGN PATENT DOCUMENTS

| | | | | |
|---|---|---|---|---|
| WO | 90/08027 | A1 | | 7/1990 |
| WO | WO-9008027 | A | * | 7/1990 |
| WO | 0185827 | A2 | | 11/2001 |

OTHER PUBLICATIONS

International Preliminary Report on Patentability in International Application No. PCT/NL2022/050561, mailed on Oct. 10, 2023, 7 pages.

* cited by examiner

METHOD FOR ELECTROMAGNETIC WELDING OF MOLDED PARTS AND A HEAT SINK FOR USE IN SUCH METHOD

This application is a national stage filing under 35 U.S.C. 371 of pending International Application No. PCT/NL2022/050561, filed Oct. 6, 2022, which claims priority to Netherlands patent application 2029435, filed Oct. 15, 2021, the entirety of which applications are incorporated by reference herein.

TECHNICAL FIELD OF THE INVENTION

The invention relates to a heat sink for use in a method for electromagnetic welding of molded parts. The invention also relates to a method for manufacturing the heat sink. The invention finally relates to an improved method for electromagnetic welding of molded parts that uses the invented heat sink.

The electromagnetic welding of the molded parts may comprise spot welding that produces a discontinuous weld at a weld point by providing a stationary inductor that, under alternating voltage, generates an electromagnetic field. The invented method and heat sink may also relate to methods of continuous welding in which the inductor is moved over the molded parts to be welded together along a weld line.

BACKGROUND OF THE INVENTION

A number of technologies exist for joining molded parts, for instance fibre reinforced thermoplastic or thermosetting composite parts. Mechanical fastening and adhesive bonding are traditionally used to join two contact surfaces of the molded parts. However, both mechanical fastening and adhesive bonding appear to be costly and time consuming. Mechanical fastening for instance requires expensive hole locating, drilling, shimming, and fastener installation, while adhesive bonding requires complicated surface pre-treatments that may involve chemical substances.

Electromagnetic welding may eliminate the use of separate fasteners and potentially offers the ability to join contact surfaces of molded composite parts at relatively high speeds and little, if any, pre-treatments. Electromagnetic welding generates an electromagnetic field in an induction-sensitive component of one or more of the molded part(s) to heat a heat meltable coupling material of the molded part(s) to above a melting temperature of the coupling material. The contact surfaces of the molded parts are joined to each other by the molten coupling material. The coupling material may for instance be a thermoplastic resin of one or more of the parts to be joined, or may be a separately applied thermoplastic resin. For welding thermoplastic and thermoset molded parts together, the thermoplastic resin that the induction-sensitive component melts may function as a hot melt adhesive for instance.

Electromagnetic (or induction) welding involves moving an induction coil along a weld line of the molded parts. The induction coil induces eddy currents in an induction-sensitive component of a molded part, for instance conductive carbon fibers disposed within the molded parts. The eddy currents generate heat and melt the coupling material, for instance a thermoplastic matrix material of the molded parts, with the intention to particularly melt the coupling material where it is needed, i.e. at the weld interface. Compressing the molded parts together creates a fusion bond or weld joint.

WO 90/08027 discloses a method of joining carbon/PEEK composite parts by electromagnetic welding. An induction coil is used to generate heat and melt the PEEK matrix material thereby joining the composite parts at the weld interface.

EP 0281347 A2 also discloses electromagnetic welding of APC2 composite materials. Water is used as cooling medium.

While electromagnetic welding is an effective method for connecting surfaces of molded parts, the inductor (or induction coil) tends to generate heat throughout the molded parts and not just at the weld joint. For example, heating may be more extensive in those portions of the molded parts that are closer to the inductor than at the weld joint. Thus, there is a need in the art for systems and methods of electromagnetic welding of molded parts that are able to concentrate heating more at the weld joint, and prevent overheating of other portions of the molded parts.

To prevent overheating, the use of heat sinks has been proposed. Such heat sinks are typically made of ceramic materials. This however hinders freedom of shape of the heat sink, and in many cases heat sinks are shaped as 2-dimensional structures, mainly plates. In order to increase freedom of shape somewhat, heat sinks have been proposed that comprise a number of interconnected smaller plates, such as disclosed in EP 3785885 A1.

There is however a need for a heat sink that may be formed in a plurality of shapes, such as intricate 3-dimensional shapes. This would increase the possibilities to induction weld molded parts with more intricate shapes. Also, it is expected that such heat sinks would perform better, due to an improved contact with an outer surface of a molded part to be cooled.

SUMMARY OF THE INVENTION

It is an object of the invention to provide an improved heat sink for use in a method for electromagnetic welding of molded parts, the heat sink overcoming at least some of the disadvantages of the known heat sink. It is another aim of the invention to provide a method for manufacturing the heat sink. Yet another aim is to provide an improved method for electromagnetic welding of molded parts that uses the invented heat sink.

The invention provides for this purpose a heat sink in accordance with claim 1. According to the invention, a heat sink for use in electromagnetic welding of molded parts is provided, the heat sink comprising reinforcing fibers embedded in a matrix material, wherein substantially all of the reinforcing fibers are oriented unidirectionally in a fiber direction, wherein the reinforcing fibers have a thermal conductivity at room temperature from 100-1000 W/m.° K and an electrical resistivity at room temperature from 0.5-10 μΩ.m, and wherein the matrix material comprises a high temperature resistant material, optionally a thermosetting resin, having a glass transition temperature Tg above 350° C.

In another aspect of the invention, a method of connecting surfaces of a first molded part and a second molded part by electromagnetic welding is provided, the method comprising the steps of:

A) providing the first and the second molded part to comprise a heat meltable coupling means and an induction-sensitive component;

B) bringing together the surfaces to be connected and pressurizing the surfaces to be connected by providing a pressurizing surface of a pressurizing body against the molded parts;

C) generating an electromagnetic field in at least the surfaces to be connected of the molded parts by means of an inductor that is moved in a welding direction, thereby heat melting the coupling means by heating the induction-sensitive component;

D) cooling the outer surface of the first molded part by providing a heat sink as claimed in direct contact with the outer surface and such that the fiber direction of the heat sink is about perpendicular to the welding direction; and E) coupling the molded parts under pressure by the molten heat meltable coupling means.

The heat sink is for use in electromagnetic welding of molded parts in that it is able to remove excessive heat from an outer surface of a molded part when providing the heat sink in direct contact with said outer surface. This concentrates heating more at the surfaces to be connected (the weld joint) than in other portions of the molded parts and further prevents overheating of said other portions of the molded parts.

Using the claimed heat sink it becomes possible to obtain a good-quality welded connection between the molded parts in a rapid and efficient manner, without the risk of overheating and burning the outer surface, wherein the welded product has a particularly good mechanical load-bearing capacity. The molded parts comprise a heat meltable coupling material and an induction-sensitive component. The claimed method generates an electromagnetic field in at least the surfaces of the molded parts to be connected by means of the inductor of the pressurizing body, thereby heat melting the coupling material by heating the induction-sensitive component. The claimed method is configured to provide a geometrically focused heated volume in the molded parts. This is made possible by providing the heat sink as claimed.

In yet another aspect of the invention, a method for manufacturing a heat sink as claimed is provided, the method comprising stacking a plurality of prepregs comprising the reinforcing fibers and the matrix material, heating the stack and consolidating the stack under pressure.

DETAILED DESCRIPTION OF THE INVENTION

The invention as disclosed above will now be elucidated further. The heat sink as claimed in claim 1 comprises reinforcing fibers embedded in a matrix material, wherein substantially all of the reinforcing fibers are oriented unidirectionally in a fiber direction. The fiber direction preferably concerns an in-plane fiber direction, defined in a plane of the heat sink. This means that the fiber direction preferably does not concern an out-of-plane direction.

During induction welding, the fiber direction in the heat sink should be perpendicular to the welding direction, where the welding coil has a linear segment which is in line with the welding direction. It has turned out that this inhibits or even prevents the occurrence of eddy currents in the heat sink, while ensuring a heat flow away from the weld zone, thus effectively cooling the top side of the molded parts to be welded. At the same time, this fiber orientation also improves load transfer from a lower tooling through the laminate over the welding slot in an upper tooling.

The term 'substantially' is used herein to mean that at least 90 vol. % of all the claimed reinforcing fibers present in the heat sink are oriented unidirectionally in a fiber direction, more preferably at least 92 vol. %, even more preferably at least 94 vol. %, even more preferably at least 96 vol. %, and most preferably at least 98 vol. %. The vol. % are here relative to the total amount of fibers used in the heat sink. Preferably, all unidirectional fibers are conductive fibres, as claimed. An optional relatively small volume of fibers in another direction are preferably non-conductive, and moreover are preferably distributed over the thickness of the heat sink laminate in relatively thin layers.

The heat sink preferably contains a fiber volume fraction of at least 55 vol. %, preferably higher than 60-65 vol. % relative to the total volume of the heat sink. The desired heat conduction indeed is fiber-dominated.

Besides the unidirectional character of the heat sink, the reinforcing fibers further are required to have a thermal conductivity at room temperature ranging from 100-1000 W/m.° K and an electrical resistivity at room temperature ranging from 0.5-10 μΩ.m. Such reinforcing fibers are commercially available.

More preferred embodiments require the reinforcing fibers to have a thermal conductivity at room temperature ranging from 250-850 W/m.° K, even more preferred from 350-750 W/m.° K, and most preferred from 400-700 W/m.° K. Other preferred embodiments require the reinforcing fibers to have an electrical resistivity at room temperature ranging from 1.0-8.0 μΩ.m, more preferably from 1.5-7.5 μΩ.m, even more preferably from 2.0-7.0 μΩ.m, and most preferably from 3.0-6.0 μΩ.m.

Particularly suitable reinforcing fibers according to embodiments comprise those that are selected from at least one of carbon UD M55J, carbon M60J and ceramic fibers.

According to the invention, the matrix material of the heat sink is required to comprise a high temperature resistant material, optionally a thermosetting resin, having a glass transition temperature Tg above 350° C. Such matrix materials are also commercially available.

A heat sink according to a preferred embodiment is characterized in that the matrix material is selected from at least one of a polycyanate ester, a polysilicone and a polyphtalonitrile. These matrix materials have proven to be particularly suited for use in the claimed heat sink.

Other suitable matrix materials include ceramic materials. They may be combined with ceramic fibers in so-called ceramic matrix composites (CMC). These CMC comprise ceramic or carbon fibers embedded in a ceramic matrix. The reinforcing ceramic fibers and the matrix both can consist of any ceramic material. The carbon fibers should preferably by highly conductive carbon fibers. Typical materials used in CMC comprise carbon (C), silicon carbide (SiC), alumina ($Al_2O_3$) and mullite ($Al_2O_3$—$SiO_2$), both in fiber from as well as as a matrix material.

The heat sink may comprise a composite laminate comprising the reinforcing fibers embedded in the matrix material without any further materials added to the laminate. It has however been established that a heat sink wherein an outer surface of the heat sink further comprises a coating, preferably comprising a polysilazane, shows an improved performance in that it may be used an increased number of times. In other words, the life time of the heat sink is extended over the life time of a heat sink not using the coating. The outer surface that is intended to contact one of the molded parts may be provided with the coating. It is also possible however to coat the other outer surface of the heat sink, intended not to contact one of the molded parts. It is also possible to provide the coating on both outer surfaces of the heat sink.

The high temperature resistant coating also helps to electrically insulate carbon fibers that are inadvertently exposed in the surface. Otherwise, there is a risk that eddy currents may develop between a lower layer of the heatsink and an upper layer of the molded parts (at least in case the fibers in the heatsink and in one of the molded parts are at an angle to each other).

In order to further enhance heat transfer from one of the molded parts to be connected to the heat sink provided in contact with said molded part, an embodiment of the heat sink provides the matrix material to comprise metal-nitride nanoparticles. The metal may be selected at will, but in a preferred embodiment the metal comprises aluminum.

An important asset of the heat sink as claimed is that it may be manufactured in virtually any shape. This not only allows increasing the freedom of shape of the molded parts to be connected, but it may also improve the heat transfer between one of the molded parts and the heat sink. This is made possible because an outer surface of the heat sink may be made to conform to a relatively high degree, and preferably exactly, to an outer surface of one of the molded parts against which surface the heat sink is provided during induction welding.

A laminated heatsink may be milled afterwards to achieve even better final tolerances. The known ceramic heatsinks are available in the form of small tiles only, for instance 50×50 mm or 25×100 mm. In case a relatively long weld line needs to be made, it is customary to provide a series of tiles in a so-called heatsink holder plate. In such case however, heat transfer from tile to tile is relatively poor, which leads to steps in the temperatures along the weld line. Using the invented heatsink, heat conduction may be much more homogeneous.

Accordingly, in an embodiment, a heat sink is provided wherein the heat sink has a 3-dimensional shape.

The reinforcing fibers of the heat sink in a preferred embodiment extend parallel to an outer surface of the heat sink. However, this may be different in other embodiments. For instance, a shape of the heat sink according to an embodiment is obtained by machining, preferably by milling. In such a case, an outer surface of the heat sink may be curved and not all reinforcing fibers may extend parallel to said curved outer surface. It may even be advantageous for heat transfer if a heat sink according to an embodiment is provided wherein part of the reinforcing fibers terminate in an outer surface of the heat sink, i.e. are interrupted in said outer surface.

As claimed, the heat sink is substantially unidirectional. However, this may weaken the heat sink in a planar direction transverse to the fiber direction. To accommodate this weakness, a heat sink according to an embodiment of the invention further comprises less conductive reinforcing fibers having a thermal conductivity at room temperature of less than 100 W/m.° K, oriented about perpendicular to the fiber direction in a plane of the heat sink. It is essential for a good performance that the transverse less conductive reinforcing fibers have a thermal conductivity at room temperature of less than 100 W/m.° K.

In a preferred embodiment of the heat sink, the fiber volume fraction of the less conductive reinforcing fibers is less than 10 vol. % of the fiber volume fraction of the reinforcing fibers, more preferably less than 8 vol. %, even more preferably less than 6 vol. %, even more preferably less than 4 vol. % and most preferably less than 2 vol. % of the fiber volume fraction of the reinforcing fibers.

Suitable less conductive reinforcing fibers comprise glass fibers of any type, such as E-glass fibers, or R-glass fibers.

The less conductive reinforcing fibers may be added unidirectionally, i.e. all extending parallel to the transverse direction. However, a practical heat sink is provided wherein the less conductive fibers comprise woven fabric having a surface weight of 10-100 g/m2, more preferably of 20-80 $g/m^2$, and most preferably of 30-60 $g/m^2$.

The heat sink may be manufactured by a method comprising stacking a plurality of prepregs comprising the reinforcing fibers and the matrix material, heating the stack and consolidating the stack under pressure. Consolidation may optionally be carried out under a partial vacuum to at least partly remove air enclosures from the heat sink. Other suitable methods include providing the reinforcing fibers in a mold first, and then injecting the matrix material in the mold under pressure. The manufacturing method allows providing a large variety of shapes to accommodate a large variety of shapes of the molded part to be connected.

In order to further increase the freedom of shape, a preferred method according to an embodiment is provided wherein the consolidated stack is machined, preferably milled, to obtain a shape of the heat sink, which shape preferably is 3-dimensional. Machining further allows achieving low dimensional tolerances.

The heat sink may be used advantageously in a method of connecting surfaces of a first molded part and a second molded part by electromagnetic welding. The method comprises the steps of:

A) providing the first and the second molded part to comprise a heat meltable coupling material and an induction-sensitive component;
B) bringing together the surfaces to be connected and pressurizing the surfaces to be connected by providing a pressurizing surface of a pressurizing body against the molded parts;
C) generating an electromagnetic field in at least the surfaces to be connected of the molded parts by means of an inductor that is moved in a welding direction, thereby heat melting the coupling means by heating the induction-sensitive component;
D) cooling the outer surface of the first molded part by providing a heat sink as claimed in direct contact with the outer surface and such that the fiber direction of the heat sink is about perpendicular to the welding direction; and
E) coupling the molded parts under pressure by the molten heat meltable coupling means.

The fibers in the heat sink should be oriented about perpendicular to the welding direction. With the wording 'about' is meant that the angle between the fiber direction and the direction of welding is within 75-105°, more preferably within 80-100°, and most preferably within 85-95°.

The heat sink may be provided as such or may be supported in a heatsink support element, for instance a support plate. The support element preferably is also made from a high temperature resistant material, such as that used in the heat sink itself, however may not be electrically conductive. If a reinforcing fiber is used in the support element, it preferably comprises glass fiber for being non-conductive. Another suitable material of the support element includes Micanite, a sheet or molded material made up of relatively thin mica lamellae (or layers), bonded together by a bonding agent such as Shellac, epoxy, alkyd or silicone resin. Strips of Micanite may also be used to prevent squeeze out of matrix material from the molded parts when induction heated. Such strips are typically positioned against side edges of the molded parts.

The first and/or second molded part may conveniently be made by fiber-reinforced composite materials, comprising reinforcing fibers such as carbon, graphite, and/or glass fibers, and a matrix material in which the reinforcing fibers are embedded. The matrix material preferably comprises a thermoplastic polymer. Examples of suitable matrix materials for the reinforcing fibers include but are not limited to thermoplastic polymers such as polyamides, polyimides, polyethersulphones, polyetheretherketone (PEEK) and polyetherketoneketone (PEKK), polyurethanes, polyphenylene sulphides (PPS), polyamide-imides, polycarbonate, polyphenylene oxide blend (PPO), as well as mixtures and copolymers of one or more of the above polymers. The fibrous composites typically comprise from 25% to 60% by volume of fibers.

The first and/or second molded part may comprise fiber-reinforced composite layers in the form of a woven fabric for instance. The layers preferably comprise substantially continuous fibers that mainly extend in one direction (so called UD material), like under angles of 0°, 90° and/or 45° with respect to a reference direction. The layers are preferably provided symmetrically with respect to a mid-plane of the laminate. It is advantageous to use the fiber-reinforced composite layer in the form of a pre-impregnated semi-finished product. Such a "prepreg" shows generally good mechanical properties, among other reasons because the fibers have already been wetted in advance by the matrix polymer. Laminates of UD reinforced fibers with a PPS and/or a PEKK polymer matrix are particularly preferred.

The heat sink may be provided between the inductor and the pressurizing surface and preferably in direct contact with both. The material of the heat sink is configured for extracting heat from the surroundings. The heat sink acts as a passive heat exchanger that transfers the heat generated in a top part of the molded parts to the surrounding air, or to cooling means provided on or in the inductor. It is also possible to provide the heat sink (a second one) in contact with a surface of the molded parts that is opposite to the pressurizing surface facing the inductor. The heat sink is than provided between the opposite surface and a counter-pressure system, for instance embodied by a rubber element that may be inflated. This configuration is particularly advantageous when the molded part facing away from the inductor is relatively thin. Such a thin molded part may melt easily.

A shielding may be provided around at least a part of the inductor in order to protect against overheating. In an exemplary embodiment of the device, the pressurizing body has two side surfaces in addition to the pressurizing surface, and a top surface opposite the pressurizing surface, and the shielding is positioned between the inductor and the side surfaces.

The material of the shielding is preferably thermally insulating. Suitable materials from which the shielding may be manufactured include but are not limited to magneto-dielectric materials, and materials having metallic particles embedded in a binder, such as electrically insulated iron particles embedded in an organic binder. These materials are commercially available, for instance under the trade name Fluxtrol®.

The geometry of the inductor, such as its cross-sectional shape, may in principal be chosen according to the needs. The cross-section may for instance be triangular, or circular. A useful embodiment relates to a device wherein the inductor has a quadrilateral cross-section.

The 3D shape of the inductor may also be chosen according to the needs. This may be relevant since, in some embodiments disclosed further below, the inductor not only needs to heat the molded parts at the position of welding, but may also need to heat other parts of the device. The electromagnetic field in some embodiments therefore needs to be extended.

This may also be provided in an embodiment wherein the inductor of the pressurizing body comprises a first and a second inductor, or even a plurality of inductors.

In an embodiment, a device is provided wherein the inductor has a linear segment such that the inductor is configured to generate a substantially cylindrical electromagnetic field in at least the surfaces to be connected of the molded parts. In this manner, the contact surface between the molded parts can be heated in highly selective manner, whereby a precise spot welded connection is obtained.

The position of the inductor in the pressurizing body may also be chosen according to the needs. In a practical embodiment of the device, the inductor is positioned in the pressurizing body such that the linear segment extends substantially parallel to the pressurizing surface of the pressurizing body.

The device according to the invention applies pressure onto the molded parts to be welded by means of the pressurizing body. Another embodiment of the device comprises counter-pressure means at a side of the joined molded parts opposite to the pressurizing surface, either passive or active.

The device as claimed in a practical embodiment is provided at an end of a robotic arm or other tool as end-effector. This allows positioning the pressurizing body accurately on the joined molded parts in order to define and effectuate a welding path.

One or more of the molded parts are preferably manufactured from a thermoplastic material which can be welded by fusion, although it is also possible to envisage arranging a thermoplastic material or a heat meltable adhesive only on the contact surface between the molded parts as thermal coupling material.

In the method, the molded parts may be provided with an electrically conductive component, for instance metal gauze, or this component is arranged between the molded parts. Foucault currents or eddy currents are induced in the electrically conductive component by a fluctuating electromagnetic field which is generated by the inductor, preferably supplied with alternating current by a generator. Owing to the Joule effect, these Foucault currents generate the heat required to melt the heat meltable coupling material. By positioning the inductor above the position to be welded, the molded parts are mutually connected at the welded position.

The use of a substantially cylindrical electromagnetic filed in an embodiment of the method, enables a controlled, uniform and targeted heating, so that overheating in the molded parts that need not be welded is prevented as far as possible. Overheating may result in degradation of material, and thereby cause undesirable weakening of the construction. A cylindrical electromagnetic field can moreover be made very narrow, up to a width of 10-20 mm.

For the purpose of heating the induction-sensitive component in the molded parts, they must be in thermal contact with the heat meltable coupling material. This is for instance possible by mixing the induction-sensitive component and the heat meltable coupling material, such as in an injection mouldable compound.

Depending on the materials used, in particular the induction-sensitive component and the distance of the inductor from this component, a suitable power and frequency can be determined. The frequency determines inter alia the penetrative power of the electromagnetic field; the electric power of the inductor determines the strength of the fluctuating electromagnetic field and thereby the degree of heat generated in the induction-sensitive component.

It is advantageous if the heat meltable coupling material comprises a thermoplastic polymer. Thermoplastic polymers can be coupled in simple manner by fusion. Furthermore, it is easy to mix a thermoplastic polymer with an induction-sensitive component such as metal gauze or carbon fibres. Examples of particularly suitable thermoplastic polymers are polypropylene, polyamide, polyether imide, polyether ether ketone and polyphenylene sulphide, although the method is in principle suitable for any thermoplastic.

The component heatable by induction preferably comprises carbon fibres and/or a metal. These materials can be readily heated by induction and also have, in addition to electrical conduction, a good thermal conduction, whereby the generated heat is well distributed. Carbon fibres incorporated in a thermoplastic polymer are recommended because the carbon fibres also improve the material strength.

In another preferred embodiment of the method the component heatable by induction comprises ferromagnetic particles. Suitable particles are for instance described in WO0185827 and have the additional advantage that, when they reach the so-called Curie temperature thereof, they lose their magnetic dipoles, whereby they do not heat any further. This can form a protection against overheating.

The Foucault currents or eddy currents induced in the surfaces to be connected are bounded by the geometry of the molded parts. Edges, corners and holes in the molded parts influence the distribution of Foucault currents and therefore also influence the heat developed. Such disruptions of the field may result in heating of components which do not have to be heated for the welding process. Conversely, it is also possible that some parts are difficult to heat. These problems can be solved by repositioning the boundaries of the area where Foucault currents may begin to occur at determined locations of the thermoplastic molded parts. With this preferred embodiment, parts that were formerly difficult to heat can nevertheless be heated and high temperatures at undesired locations can be prevented.

For application in the method as claimed in the invention, the inductor is connected to an alternating current generator, wherein the alternating current generator is electrically connected to the electrical connecting means of the inductor. Usable frequencies lie generally between 0.1-10 MHz. A frequency between 0.1 and 0.5 MHz is preferably used, and more preferably a frequency between 0.15 and 0.4 MHz. At such a preferred frequency an optimal balance is achieved between penetrative power of the electromagnetic field and rate of heating.

It is advantageous if the inductor is substantially flat or has a straight section. This is possible for instance by embodying the inductor as an electrical conductor lying in one plane. Such a flat inductor is exceptionally compact and suitable for applying an electromagnetic field at a determined position in very precise and uniform manner.

In a further preferred embodiment, the inductor is provided with at least one feed channel adapted for passage of a cooling medium, such as in sheath cooling. The temperature of the inductor can hereby be held constant during use, this also being favourable for the electrical resistance of the inductor. The cooling medium is preferably a liquid such as water, with a high heat capacity. The induction part can for instance be a metal tube bent into the desired form, through which the cooling medium is pumped while an electromagnetic field is caused through the metal of the tube itself with an alternating voltage.

The method according to the invention using the claimed heat sink may connect first and second molded parts of any shape. Or instance, the first molded part may comprise a skin panel of an aircraft, and the second molded part may comprise a stiffener for supporting the skin panel. Other examples include window frames for aircraft, covers for fuel tanks, wind turbine components, and the like.

BRIEF DESCRIPTION OF THE FIGURES

Examples of the invention will now be elucidated with reference to the following figures, without however being limited thereto. In the figures.

DESCRIPTION OF EXEMPLARY EMBODIMENTS

Figure 1:
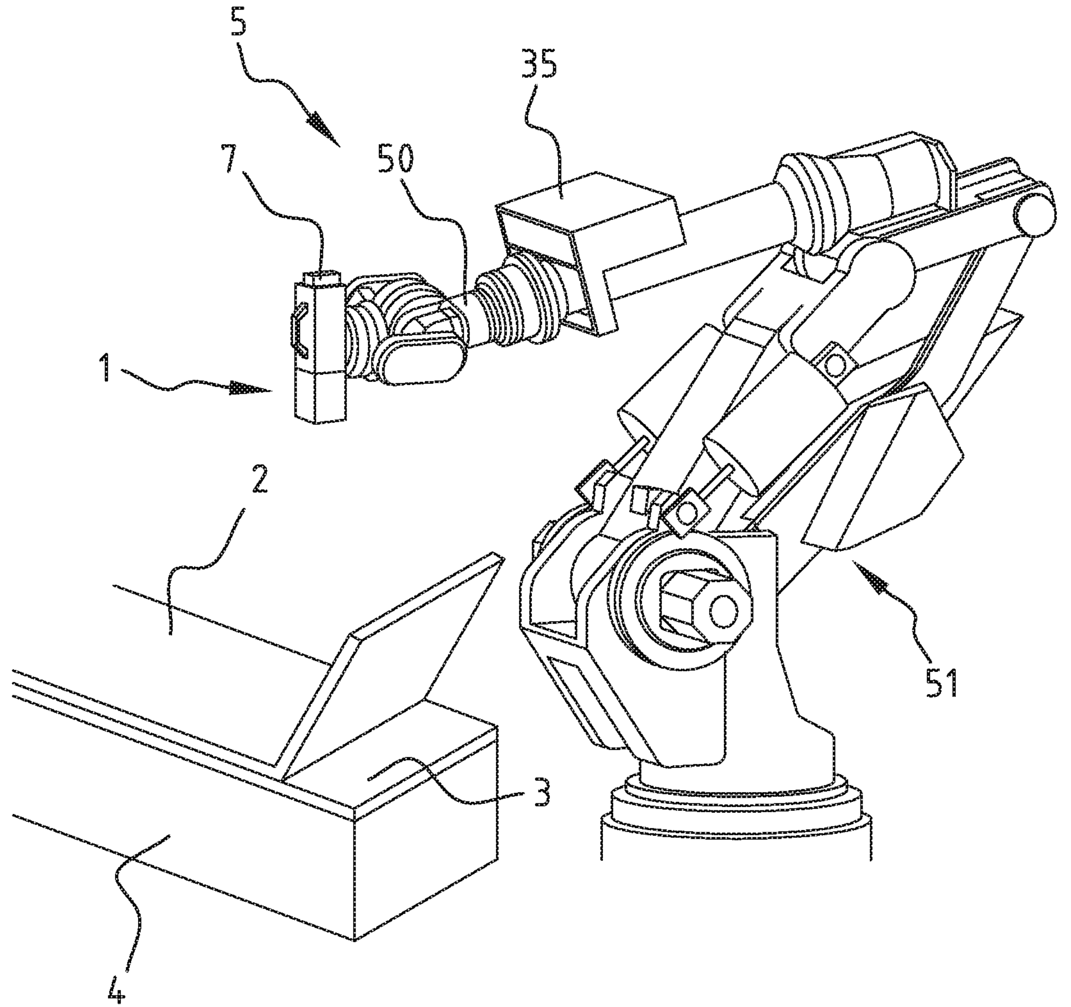
FIG. 1 schematically shows a welding system that may be used in a method in accordance with an embodiment of the invention.

FIG. 1 shows a welding system 5 provided with a device 1 that may be used in the method in accordance with an embodiment of the invention. The device 1 acts as an end-effector of a robotic arm 50 that is part of an industrial six-axis robot 51. It should be noted that the robotic arm 50 is not essential to the invention and that other displacing means for the device 1 may be envisaged, such as a static actuator. The robot 51 is programmed to move the robotic arm 50 and the end-effector device 1 towards an assembly of molded parts (2, 3) to be welded along a path, or to be welded in positions where a spot weld has to be made. An inductor 11 that is incorporated in a pressurizing body 10 of the device 1 (see FIG. 2) is in operation connected to an alternating current generator 52 arranged on the robot 51 for the purpose of generating an electromagnetic field. The alternating current generator 52 may however be positioned elsewhere, and may even be incorporated in the pressurizing body 10 of the device 1. In the embodiment shown, counter-pressure means 4 are provided at a side of the joined molded parts (2, 3) opposite to the side where the robotic arm 50 is approaching the assembly (2, 3). The counter-pressure means 4 may be embodied as a solid body or may be active in the sense that it can be pressed against said side of the joined molded parts (2, 3).

Figure 2:
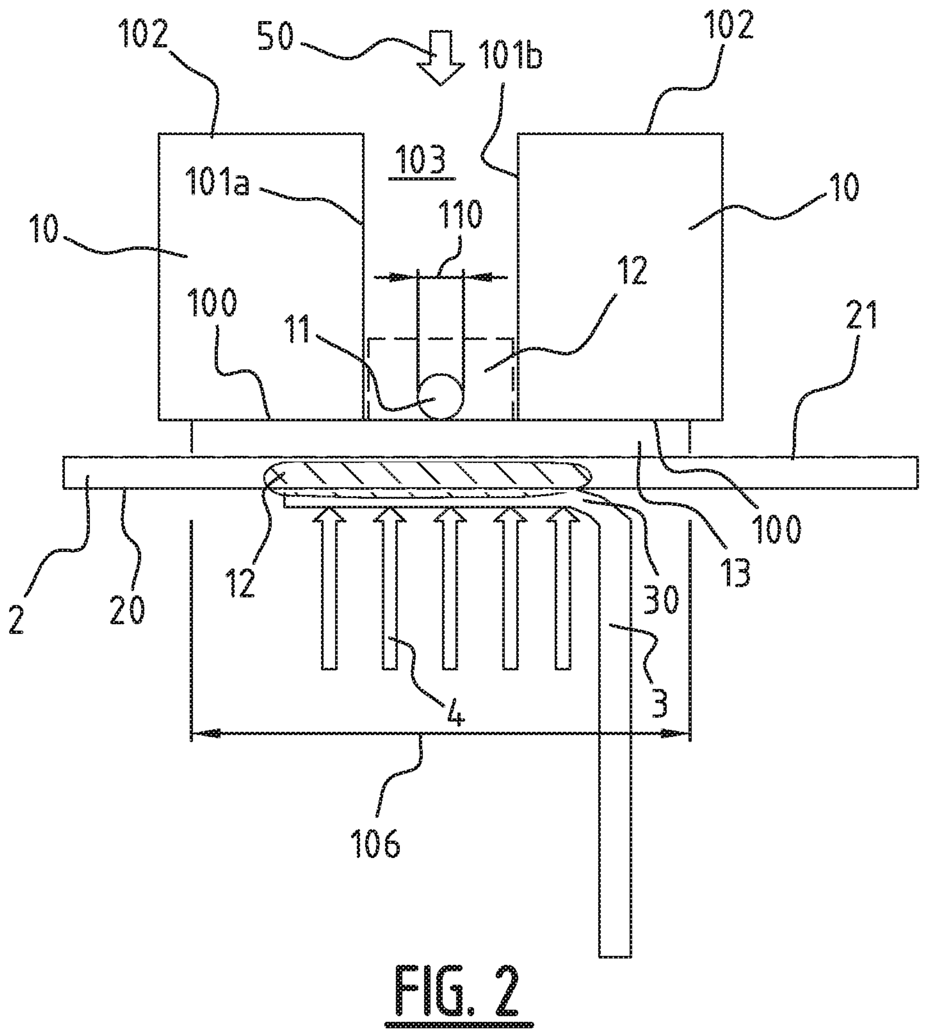
FIG. 2 schematically shows a cross-sectional view of a step of the welding method in accordance with an embodiment of the invention.

As shown in more detail in FIG. 2, a suitable device 1 for connecting surfaces of the molded parts (2, 3) by electromagnetic welding comprises a pressurizing body 10 that may be a solid block of high-temperature non-metallic material may be embodied otherwise, as long as it may exert pressure on a substrate. The pressurizing body 10 of FIG. 2 has two side surfaces (101*a*, 101*b*) in addition to the pressurizing surface 100, and a top surface 102 opposite the pressurizing surface 100. As shown, the pressurizing body 10 further has a central cavity 103 in certain embodiments, described further below, but the central cavity is not an essential feature for the invention. Please note that FIG. 2 represents a cross-sectional view though a vertical mid-plane of the device 1. Although the cavity 103 may appear open at a front side, it will in embodiments be enclosed by the pressurizing body 10 material, such as in a central cylindrical cavity provided in a solid block for instance.

The robotic arm 50 is programmed to move a pressurizing surface 100 of the pressurizing body 10 against the molded parts (2, 3) or vice versa. As shown in FIG. 2, contact surfaces (20, 30) of the molded parts (2, 3) to be fused by welding are then joined (but not yet welded) under pressure.

According to FIG. 2, the pressurizing body 10 further comprises an inductor 11 provided in the pressurizing body 10. The inductor 11 is configured to generate an electromagnetic field 12 in at least the contact surfaces (20, 30) to be connected of the molded parts (2, 3). In the embodiment shown, the inductor 11 has a cylindrical cross-section, and further is provided with a linear segment such that the inductor is configured to generate a substantially cylindrical electromagnetic field in at least the contact surfaces (20, 30) to be connected of the molded parts (2, 3). In this way, the electromagnetic filed may be concentrated to not extend much further than the position to be welded. The linear segment(s) in FIG. 2 extend substantially parallel to the pressurizing surface 100 of the pressurizing body 10. More than one inductor may be used.

A shielding 12 may also be provided in the pressurizing body 10 around at least a part of the inductor 11. The shielding is configured to protect against overheating, and is thereto made from a suitable heat isolating material, such as Fluxtrol®. The shielding 12 comprises a block structure that is positioned between the inductor 11 and the side surfaces (101*a*, 101*b*) of the pressurizing body 10.

The invented device 10 further comprises a heat sink 13 that may be incorporated in the pressurizing body 10 and is provided in between the inductor 11 and the pressurizing surface 100. Preferably however, the heat sink 13 is a separate body. The heat sink 13 moreover is positioned such that it is in direct contact with (a lower surface of) the inductor 11 and the pressurizing surface 100. The heat sink 13 may be embodied as a plate like structure that moreover, may have a planar dimension 106 in contact with the pressurizing surface 100 that is larger than a cross-sectional dimension 110 of the inductor 11. The heat sink 13 is made from a composite material as claimed. As will be shown hereunder, this allows shaping the heat sink 13 in a number of 3-dimensional shapes.

In an initial step (FIG. 2), a device 1 is provided in proximity to a first molded part 2 and a second molded part 3 that need to be connected that electromagnetic welding. The molded parts (2, 3) are separated from each other at first but are brought together by moving the pressurizing surface 100 of the pressurizing body 10 against the molded parts (2, 3) or vice versa with the robotic arm 50 such that the contact surfaces (20, 30) of the molded parts (2, 3) to be fused by welding are brought together or joined (but not welded) under pressure. The molded parts (2, 3) comprise a heat meltable coupling material and an induction-sensitive component to heat them up under the influence of an electromagnetic field, produced by the inductor 11. Thereto, the molded parts (2, 3) may be manufactured from a thermoplastic polymer reinforced with carbon fibres, wherein the carbon fibres may serve as induction-sensitive component, whereas the thermoplastic polymer may serve as heat meltable coupling material. The molded parts (2, 3) can for instance comprise carbon fibre-reinforced polyphenylene sulphide, for instance with a material thickness of 1-3 mm. The first molded part 2 may represent the skin of an aircraft, while the second molded part 3 may have a folded edge, and may for instance represent a stiffener. Obviously, both molded parts (2, 3) may have another shape, such as being curved.

Another step comprises generating an electromagnetic field in at least the contact surfaces (20, 30) toe be connected of the molded parts (2, 3) with the inductor 11 of the pressurizing body 10, while at the same time optionally cooling the inductor 11 with the sheath cooling 111. This heats (and possibly melts) the thermoplastic polymer of the molded parts (2, 3) in a volume that covers part of the contact surfaces (20, 30) of both molded parts (2, 3) by heating the carbon fibers in the molded parts (2, 3). The temperature in the volume may not be uniform throughout, and a central part of the volume only may have a temperature that exceeds the melting temperature of the thermoplastic polymer. The heat sink 13 provided against one (20) of the two molded parts (20, 30) is instrumental in focusing the heat in the volume where it is needed (around the welding path) and take away heat from parts where it is not needed. Also, a cylindrical electromagnetic field is preferred for this reason. Such a field may be induced by an inductor 11 having linear segment(s). The specific configuration of the pressurizing body 10 that comprises shielding 12 and the heat sink 13 may also provide a controlled and well focused heated volume. The heating of the molded parts (2, 3) in the joined configuration to a temperature which is high enough to heat melt the thermoplastic polymer (or optionally a heat meltable adhesive applied to contact surfaces (20, 30) fuses the two molded parts (2, 3) together at least in a volume along a welding path. During the heating and/or optionally a short time thereafter, the contact surfaces (20, 20) are preferably pressed together by the pressurizing body 10 itself, and by counter-pressure means 4, so as to thus bring about a connection between the molded parts (2, 3). The pressuring body 10 is finally removed from the welded molded parts (2, 3) by the robotic arm 50.

Figure 3:
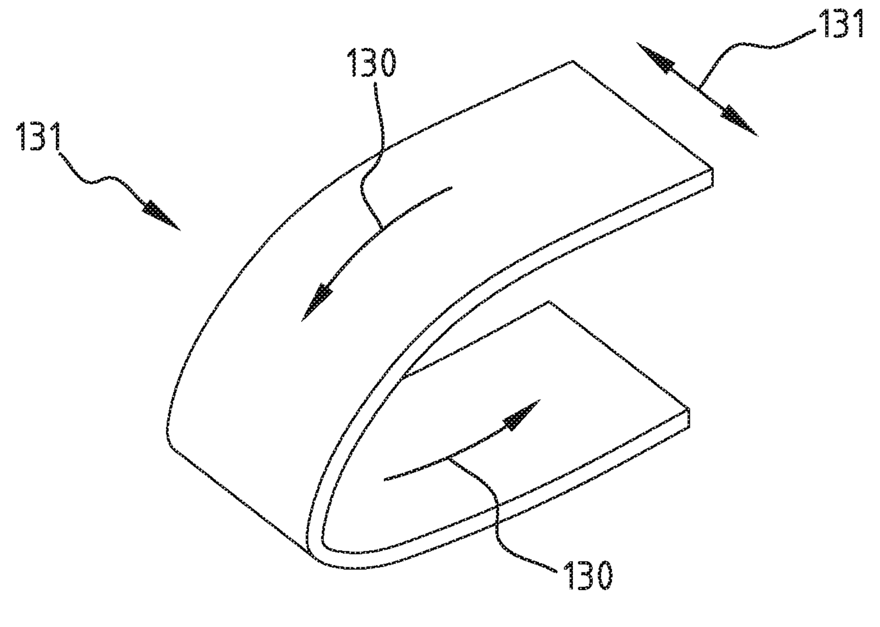
FIG. 3 schematically shows a heat sink in accordance with an embodiment of the invention.

With reference to FIG. 3, a heat sink 13-1 according to an embodiment of the invention is shown. The heat sink 13-1 is used to connect two molded parts (not shown) having a relatively strong curvature. The heat sink 13-1 comprises layers of carbon UD M55J fibers embedded in a polysilicone resin (High Temperature resin from Flexible Ceramics, Inc). The polysilicone matrix material is based on Dow Corning 249, 233, 3037 and MR-2404 silicone resins. The layers are stacked such that all reinforcing carbon fibers extend in the same direction 130 (UD material). Induction welding is performed in a direction 131 that is perpendicular to the direction 130.

Figure 4:
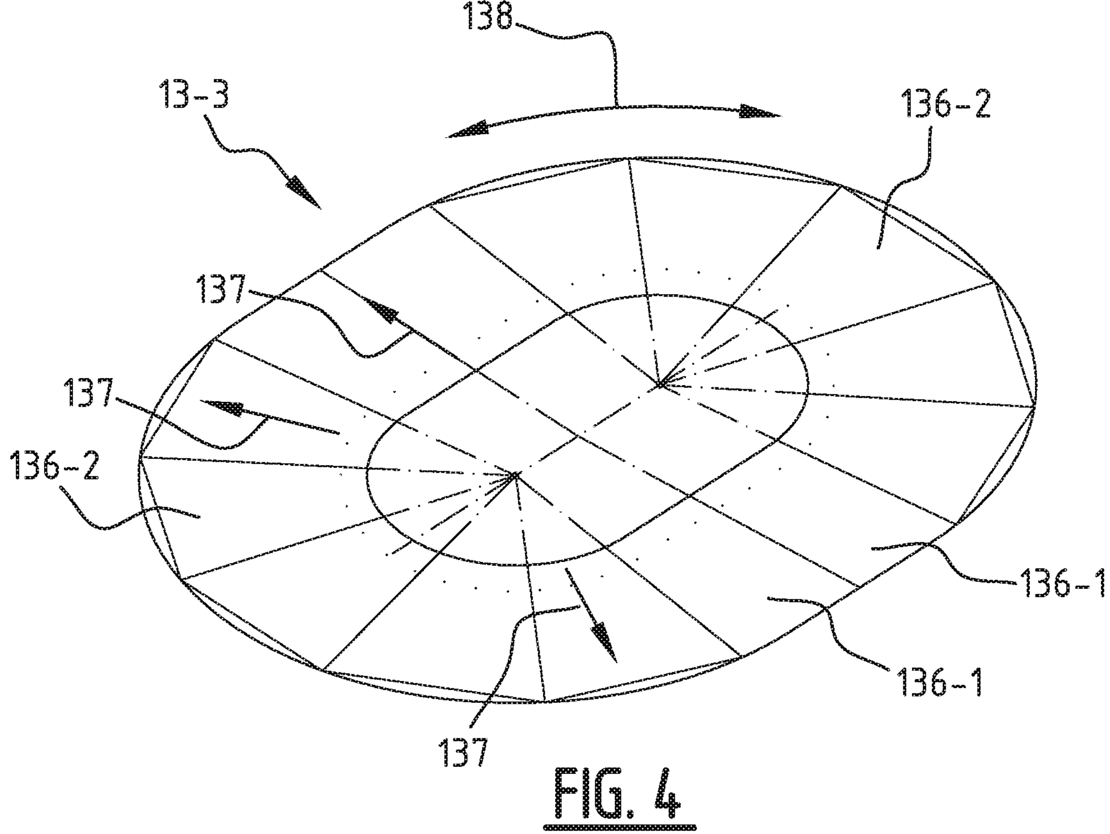
FIG. 4 schematically shows a heat sink in accordance with yet another embodiment of the invention.

With reference to FIG. 4, a heat sink 13-3 according to yet another embodiment of the invention is shown. The heat sink 13-3 is used to connect parts of an aircraft window frame. It is built up by a number of interconnected subparts in the form of squares (136-1) or parallelograms (136-2). The heat sink 13-3 comprises layers of carbon M60J fibers embedded in a Primaset PT-30 cyanate ester resin from Lonza. The layers are stacked such that the reinforcing carbon fibers for each subpart (136-1, 136-2) extend radially outwards in a direction 137 (UD material). Induction welding is then performed in a circumferential direction 138 that is about perpendicular to each direction 137.

The invention claimed is:

1. A heat sink for use in electromagnetic welding of molded parts, the heat sink comprising:

reinforcing fibers embedded in a matrix material, wherein substantially all of the reinforcing fibers are oriented unidirectionally in a fiber direction, wherein the reinforcing fibers have a thermal conductivity at room temperature from 100-1000 W/m.° K and an electrical resistivity at room temperature from 0.5-10 μΩ.m, and wherein the matrix material comprises a high temperature resistant material, optionally a thermosetting resin, having a glass transition temperature Tg above 350° C.

2. The heat sink as claimed in claim 1, further comprising less conductive reinforcing fibers having a thermal conductivity at room temperature of less than 100 W/m.° K, oriented about perpendicular to the fiber direction.

3. The heat sink as claimed in claim 2, wherein the fiber volume fraction of the less conductive reinforcing fibers is less than 10 vol. % of the fiber volume fraction of the reinforcing fibers.

4. The heat sink as claimed in claim 2, wherein the less conductive reinforcing fibers comprise glass fibers.

5. The heat sink as claimed in claim 2, wherein the less conductive fibers comprise woven fabric having a surface weight of 10-100 g/m2.

6. The heat sink as claimed in claim 1, wherein the matrix material comprises metal-nitride nanoparticles.

7. The heat sink as claimed in claim 6, wherein the metal comprises aluminum.

8. The heat sink as claimed in claim 1, wherein a shape of the heat sink is obtained by machining.

9. The heat sink as claimed in claim 8, wherein part of the reinforcing fibers terminate in an outer surface of the heat sink.

10. The heat sink as claimed in claim 1, wherein the matrix material is selected from at least one of a polycyanate ester, a polysilicone and a polyphtalonitrile.

11. The heat sink as claimed in claim 1, wherein an outer surface of the heat sink further comprises a coating.

12. The heat sink as claimed in claim 1, wherein the reinforcing fibers are selected from at least one of carbon UD M55J, carbon M60J and ceramic fibers.

13. The heat sink as claimed in claim 1, wherein the heat sink has a 3-dimensional shape.

14. The heat sink as claimed in claim 1, wherein the reinforcing fibers extend parallel to an outer surface of the heat sink.

15. The heat sink as claimed in claim 1, wherein an outer surface of the heat sink further comprises a coating comprising a polysilazane.

16. A method for manufacturing the heat sink as claimed in claim 1, the method comprising:

stacking a plurality of prepregs comprising the reinforcing fibers and the matrix material, heating the stack, and consolidating the stack under pressure.

17. The method as claimed in claim 16, wherein the consolidated stack is machined to obtain a shape of the heat sink.

18. The method as claimed in claim 17, wherein the shape is 3-dimensional.

19. The method as claimed in claim 16, wherein the consolidated stack is milled to obtain a shape of the heat sink.

20. A method of connecting surfaces of a first molded part and a second molded part by electromagnetic welding, comprising the steps of:

A) providing the first and the second molded part to comprise a heat meltable coupling material and an induction-sensitive component;

B) bringing together the surfaces to be connected and pressurizing the surfaces to be connected by providing a pressurizing surface of a pressurizing body against the molded parts;

C) generating an electromagnetic field in at least the surfaces to be connected of the molded parts by means of an inductor that is moved in a welding direction, thereby heat melting the coupling material by heating the induction-sensitive component;

D) cooling the outer surface of the first molded part by providing the heat sink as claimed in claim 1 in direct contact with the outer surface and such that the fiber direction of the heat sink is about perpendicular to the welding direction; and E) coupling the molded parts under pressure by the molten heat meltable coupling material.

* * * * *